United States Patent
Kung et al.

(10) Patent No.: US 7,605,571 B2
(45) Date of Patent: Oct. 20, 2009

(54) SWITCHING REGULATOR WITH LOWER TRANSISTOR CAPABLE OF TWO STATES OF ON OR LOW CURRENT

(75) Inventors: Nien-Hui Kung, HsinChu (TW); Kwan-Jen Chu, HsinChu (TW)

(73) Assignee: Richtek Technology Corporation, Hsin-Chu (TW)

( * ) Notice: Subject to any disclaimer, the term of this patent is extended or adjusted under 35 U.S.C. 154(b) by 21 days.

(21) Appl. No.: 11/893,956

(22) Filed: Aug. 17, 2007

(65) Prior Publication Data

US 2008/0074092 A1    Mar. 27, 2008

(30) Foreign Application Priority Data

Sep. 22, 2006    (TW) ............................... 95135096 A

(51) Int. Cl.
*G05F 1/618*    (2006.01)
(52) U.S. Cl. ...................................... 323/223; 323/282
(58) Field of Classification Search ................. 323/223, 323/282, 222, 224, 226; 363/39, 41, 127, 363/56.04; 327/110
See application file for complete search history.

(56) References Cited

U.S. PATENT DOCUMENTS

| | | | | |
|---|---|---|---|---|
| 5,672,993 | A * | 9/1997 | Runaldue | 327/404 |
| 6,107,844 | A * | 8/2000 | Berg et al. | 327/110 |
| 6,275,399 | B1 * | 8/2001 | Miyazaki et al. | 363/98 |
| 6,333,623 | B1 * | 12/2001 | Heisley et al. | 323/280 |
| 6,747,441 | B2 * | 6/2004 | Johnson et al. | 323/282 |
| 6,798,178 | B1 * | 9/2004 | Bayadroun | 323/274 |
| 2006/0158127 | A1 * | 7/2006 | Xu | 315/128 |
| 2006/0192589 | A1 * | 8/2006 | Okazaki et al. | 326/112 |
| 2007/0040542 | A1 * | 2/2007 | Cortigiani et al. | 323/312 |
| 2008/0084197 | A1 * | 4/2008 | Williams et al. | 323/282 |

OTHER PUBLICATIONS

Adel Sedra and Kenneth Smith, Microelectronic Circuits, Dec. 1991, Third Edition, Saunders College Publishing, p. 428.*

* cited by examiner

*Primary Examiner*—Adolf Berhane
*Assistant Examiner*—Harry Behm
(74) *Attorney, Agent, or Firm*—Tung & Associates

(57) ABSTRACT

The present invention discloses a switching regulator, which comprises: a first and a second transistors electrically connected with each other; a pulse width modulation control circuit for turning ON and OFF the first transistor and turning ON the second transistor; and a current source control circuit for controlling the second transistor so that the second transistor becomes a current source, wherein the second transistor has only two states: ON and low current, and wherein when the first transistor is ON, the second transistor is in the low current state; and when the first transistor is OFF, the second transistor is ON or in the low current state.

20 Claims, 8 Drawing Sheets

SWITCHING REGULATOR WITH LOWER TRANSISTOR CAPABLE OF TWO STATES OF ON OR LOW CURRENT

FIELD OF THE INVENTION

The present invention relates to a switching regulator and control circuit and method therefor. In particular, the present invention relates to a switching regulator having high efficiency and low EMI (Electro-Magnetic Interference), and a control circuit and a control method for the switching regulator.

BACKGROUND OF THE INVENTION

Typical switching regulators include buck converter, booster converter and inverter converter. FIG. 1 shows a conventional buck converter, which includes two transistor switches Q1 and Q2 controlled by a pulse width modulation control circuit (PWM) 10. The switching of the transistors Q1 and Q2 controls the current amount and direction on the inductor L, so that power is transmitted to the output terminal OUT. The PWM 10 receives a voltage signal which is fed back from the output terminal, and compares it with a reference voltage Vref, to determine the duties of the transistors Q1 and Q2.

In early days, the transistors Q1 and Q2 are completely complementary to each other, and such switching regulator is called "synchronous switching regulator". Referring to FIG. 2, when the transistor Q1 is ON, the transistor Q2 is OFF, and vise-versa. (In the context of this specification, "ON" is fully conductive, and "OFF" is non-conductive, regardless of leakage current.) In such synchronous switching regulator, the current $I_L$ of the inductor has a waveform as shown by the third waveform of FIG. 2: When the transistor Q1 is ON and the transistor Q2 is OFF, the current flows towards the output terminal OUT (shown by "+" in the figure), and the current amount increases. When the transistor Q2 is ON and the transistor Q1 is OFF, the voltage at the node Lx at the left side of the inductor drops to 0, and the voltage at the output terminal OUT is higher than the voltage at the node Lx, so the current trend reverses, first the current amount towards the output terminal decreases, and later the current starts to flow towards the other direction (shown by "−" in the figure).

FIGS. 3 and 4 respectively show a booster type switching regulator 2 and an inverter type switching regulator 3, which operate in a similar manner as above, in which a PWM 10 controls two transistors Q1 and Q2 to transmit power to the output terminal OUT according to comparison between a feedback voltage and a reference voltage Vref. These regulators are well known by one skilled in this art, so the details of their operation are omitted here.

Referring to FIGS. 1 and 2, there is a drawback to synchronously switch the transistors Q1 and Q2, because when the direction of the inductor current is negative, i.e., when current flows from the output terminal OUT to ground via the inductor L and the transistor Q2, it means that there is loss of power from the output terminal OUT.

Accordingly, U.S. Pat. No. 6,580,258 proposes a countermeasure as shown in FIG. 5, in which the transistors Q1 and Q2 are properly controlled so that the Q2 is turned OFF when the direction of the inductor current is about to change from positive to negative. Thus, there is no power loss from the output terminal OUT. As shown in the figure, there is a time period T wherein the transistors Q1 and Q2 are both OFF, which is called the "sleep mode".

However, this prior art has its drawback. When the transistors Q1 and Q2 are both OFF, entering the sleep mode, the actual waveforms of the current flowing on the inductor L and the voltage at the node Lx are not ideal. As shown in FIG. 7, when the transistors Q1 and Q2 are both OFF, the current $I_L$ of the inductor L presents a ringing waveform, and the voltage $V_{Lx}$ at the node Lx presents a waveform of damped simple harmonic motion. To explain it, as shown in FIG. 6, in practical case there is a parasitic resistor $R_{pa}$ connected in series with the inductor L, and a parasitic capacitor $C_{pa}$ connected in parallel with the transistor Q2. Let the inductance of the inductor L, the resistance of the parasitic resistor $R_{pa}$, and the capacitance of the parasitic capacitor $C_{pa}$ be L, $R_{pa}$, and $C_{pa}$, respectively; then, the voltage $V_{Lx}$ at the node Lx should be:

$$V_{Lx}=(V_{OUT}/LC_{pa})\times\{1/[S^2+S(R_{pa}/L)+1/LC_{pa}]\}$$

wherein $V_{Lx}$ is the voltage at the node Lx, Vout is the voltage at the output terminal OUT, and S is a time-to-frequency conversion variable.

The voltage $V_{Lx}$ at the node Lx expressed by the above equation presents a high frequency damping waveform, having an angular frequency $\omega_0$ and a damping quality Q respectively as:

$$\omega_0=1/(LC_{pa})^{1/2}$$

$$Q=L^{1/2}/[R_{pa}(C_{pa}^{1/2})]$$

Because the voltage $V_{Lx}$ at the node Lx presents a high frequency damping waveform, it generates EMI noises which are undesired.

In view of the foregoing drawback, the present invention proposes a switching regulator with reduced EMI, and a control circuit and a control method for the switching regulator.

SUMMARY OF THE INVENTION

A first objective of the present invention is to provide a switching regulator having better power conversion efficiency as compared with a conventional synchronous switching regulator, while having significantly reduced EMI noises as compared with the conventional switching regulator shown in FIGS. 5 and 7.

A second objective of the present invention is to provide a control circuit for controlling the switching regulator.

A third objective of the present invention is to provide a control method for controlling the switching regulator.

To achieve the foregoing objectives, according to an aspect of the present invention, a switching regulator comprises: a first and a second transistors electrically connected with each other; a pulse width modulation control circuit for turning ON and OFF the first transistor and turning ON the second transistor; and a current source control circuit for controlling the second transistor so that the second transistor becomes a current source.

The pulse width modulation control circuit and the current source control circuit mentioned above can be directly electrically connected with the gate of the second transistor, or electrically connected with the gate of the second transistor via a multiplexer circuit.

According to another aspect of the present invention, a control circuit for a switching regulator is disclosed, the switching regulator having a first and a second transistors electrically connected with each other, and the control circuit comprising: a current source control circuit for controlling the second transistor to be ON or in a low current state when the first transistor is OFF, in the low current state the amount of current passing through the second transistor being higher than or equal to 1 µA (micro-ampere).

According to a further aspect of the present invention, a control method for a switching regulator is disclosed, the method comprising the steps of: providing a switching regulator having a first and a second transistors electrically connected with each other; and when the first transistor is OFF, controlling the second transistor to be ON or in a low current state, in the low current state the amount of current passing through the second transistor being higher than or equal to 1 µA (micro-ampere).

It can be arranged so that the second transistor described above has three states: ON, OFF, and low current state, or that the second transistor has two states: ON and low current state. In the former case, when the first transistor is ON, the second transistor is OFF; and when the first transistor is OFF, the second transistor is ON or in the low current state. In the latter case, when the first transistor is ON, the second transistor is in the low current state; and when the first transistor is OFF, the second transistor is ON or in the low current stat.

For better understanding the objectives, characteristics, and effects of the present invention, the present invention will be described below in detail by illustrative embodiments with reference to the attached drawings.

DETAILED DESCRIPTION OF THE PREFERRED EMBODIMENT

Figure 1:
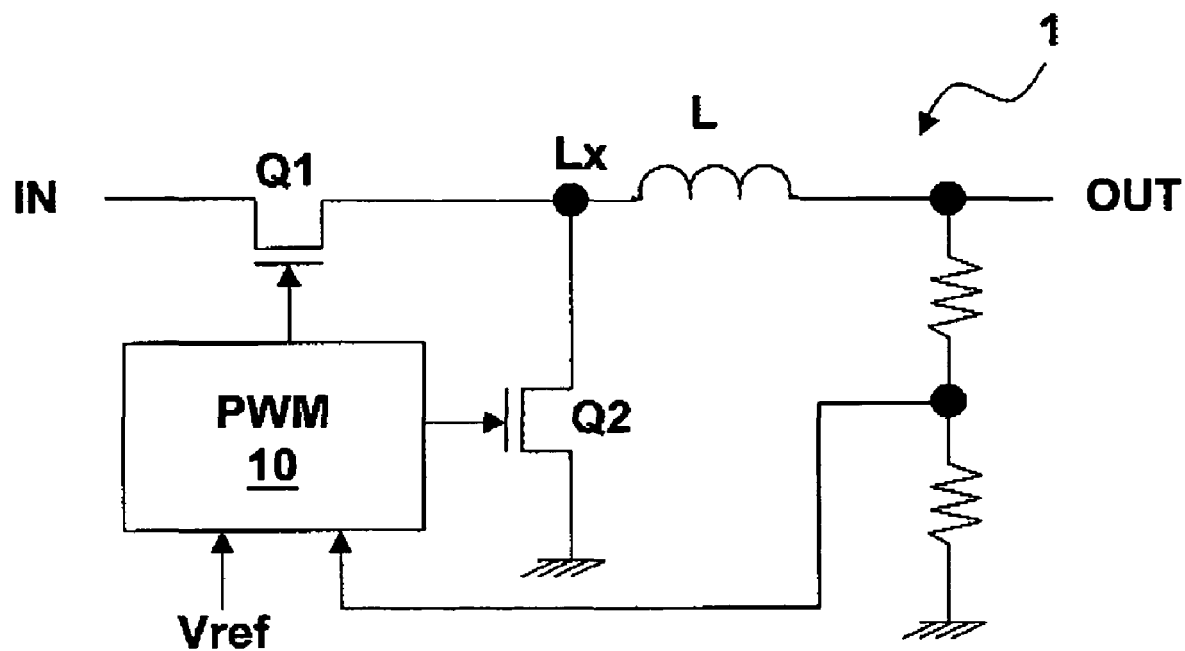
FIG. 1 is a circuit diagram schematically showing a conventional buck type switching regulator.
Figure 2:
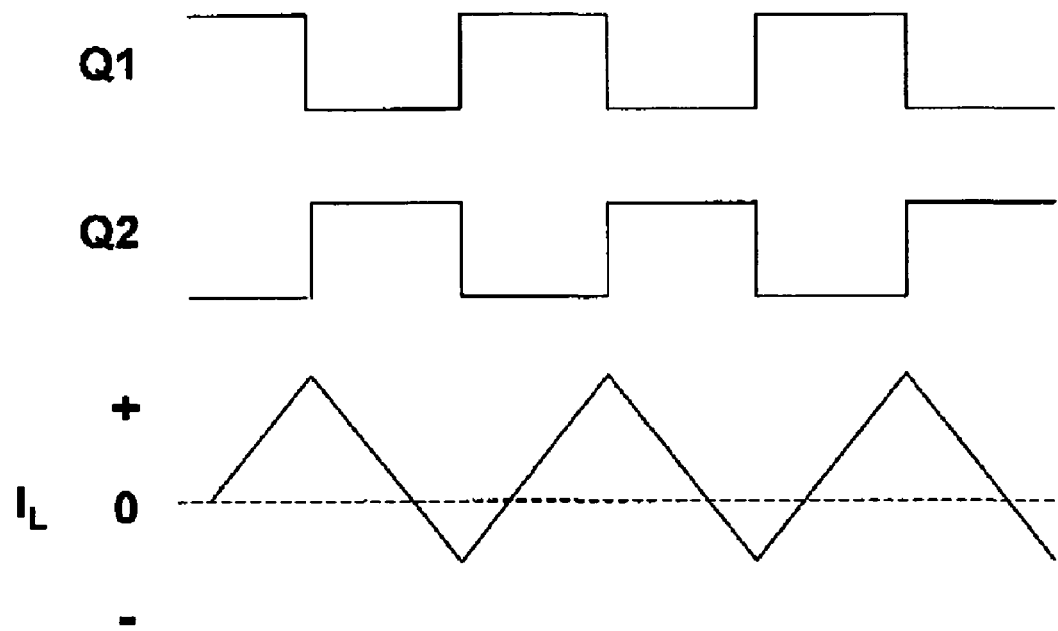
FIG. 2 schematically shows the waveforms in a conventional synchronous switching regulator.
Figure 3:
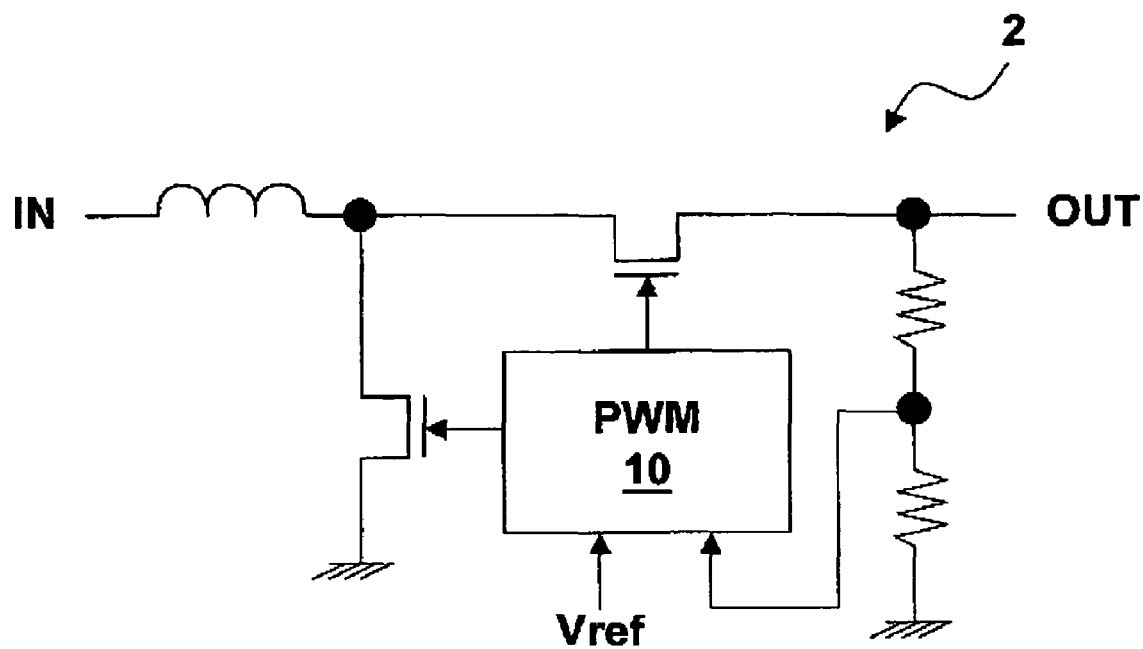
FIG. 3 is a circuit diagram schematically showing a conventional boost type switching regulator.
Figure 4:
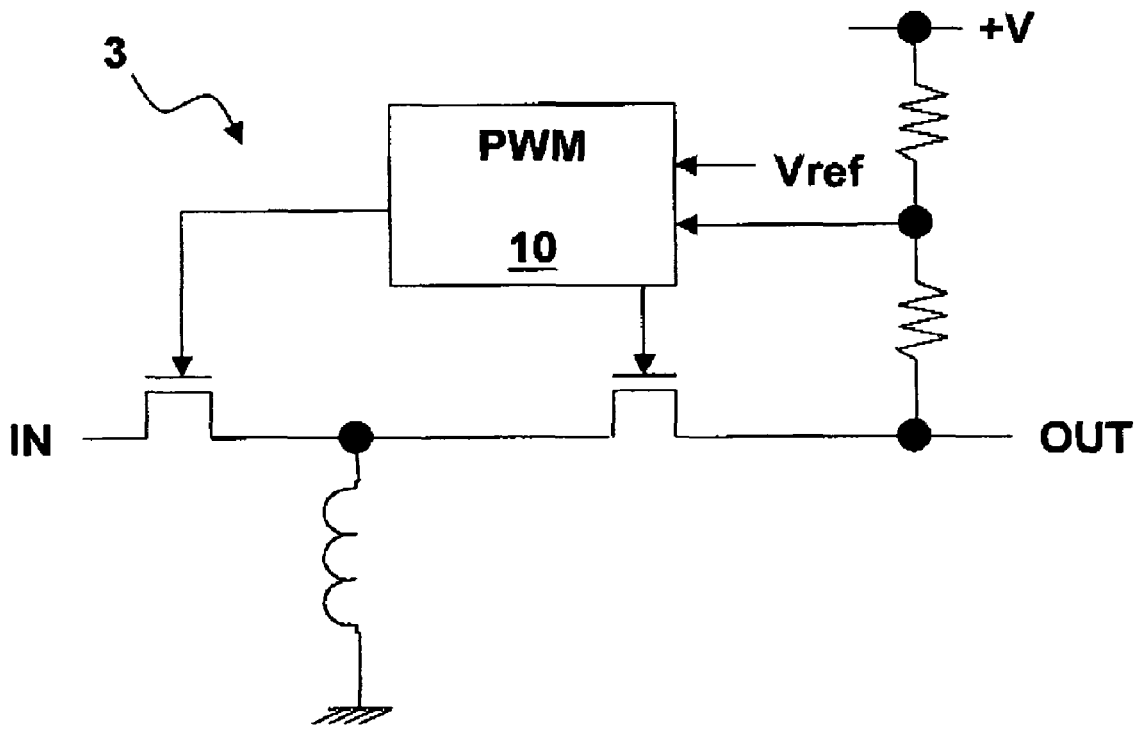
FIG. 4 is a circuit diagram schematically showing a conventional inverter type switching regulator.

The key feature of the present invention is "not to concurrently turn OFF the transistors Q1 and Q2". When the current $I_L$ on the inductor L is about to change from positive to negative, the transistor Q2 is not completely turned OFF, but its role is changed from a transistor switch to a current source that allows low current to flow through. Thus, as compared with the prior art in FIG. 2, the present invention has better power conversion efficiency, and in comparison with the conventional switching regulator shown in FIGS. 5 and 7, the present invention has significantly reduced EMI noises.

Figure 9:
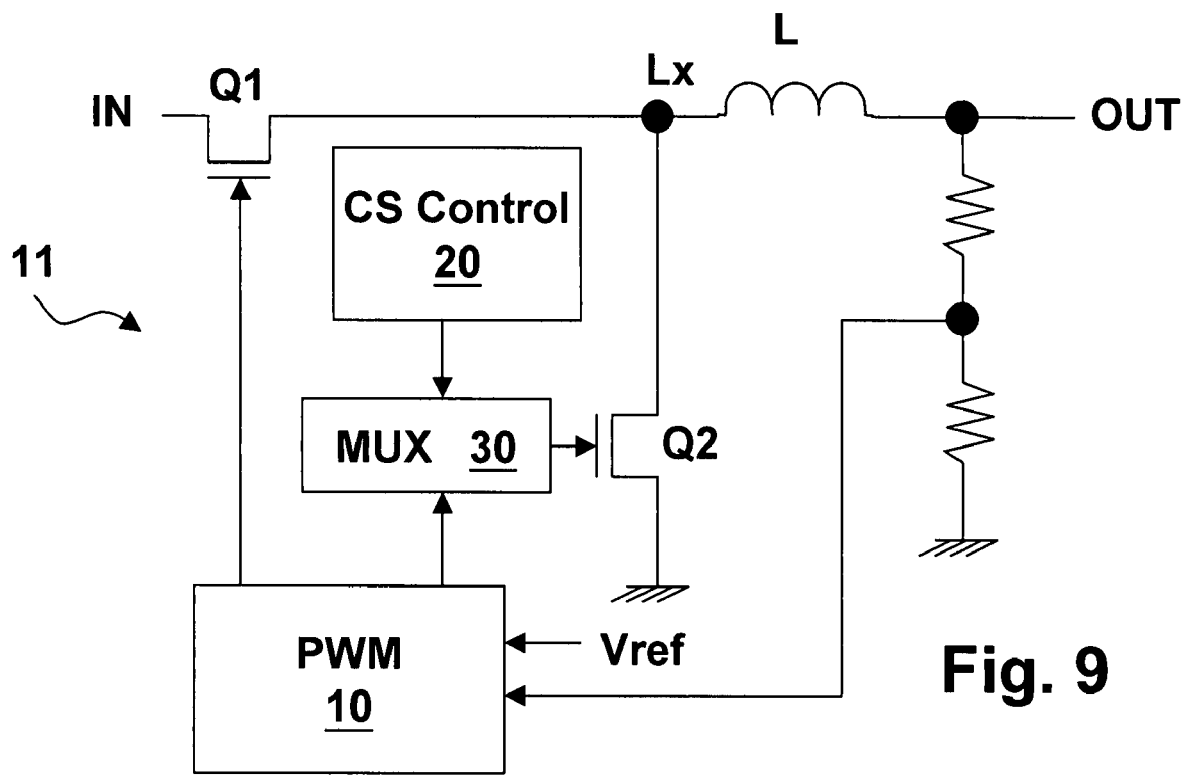
FIG. 9 is a circuit diagram schematically showing a buck type switching regulator according to an embodiment of the present invention.

Referring to FIG. 9 which schematically shows a preferred embodiment of a buck type switching regulator according to the present invention, the buck type switching regulator 11 includes, in addition to the up-gate and low-gate transistor switches Q1 and Q2, the inductor L, and the PWM control circuit (PWM) 10, a current source control circuit (CS control) 20. The output signals from the PWM 10 and the current source control circuit 20 are sent to a multiplexer circuit (MUX) 30, which decides the role (the controlled status) of the transistor Q2. In other words, the transistor Q2 is dynamically controlled by the PWM 10 or the current source control circuit 20, depending on the output of the MUX 30. When the transistor Q2 is controlled by the PWM 10, its role is a switch; when the transistor Q2 is controlled by the current source control circuit 20, its role is a current source. (For clarity, the term "current source control circuit" means that this circuit controls the transistor Q2 to become a current source; it does not mean that this circuit is subject to the control from a current source.)

Figure 5:
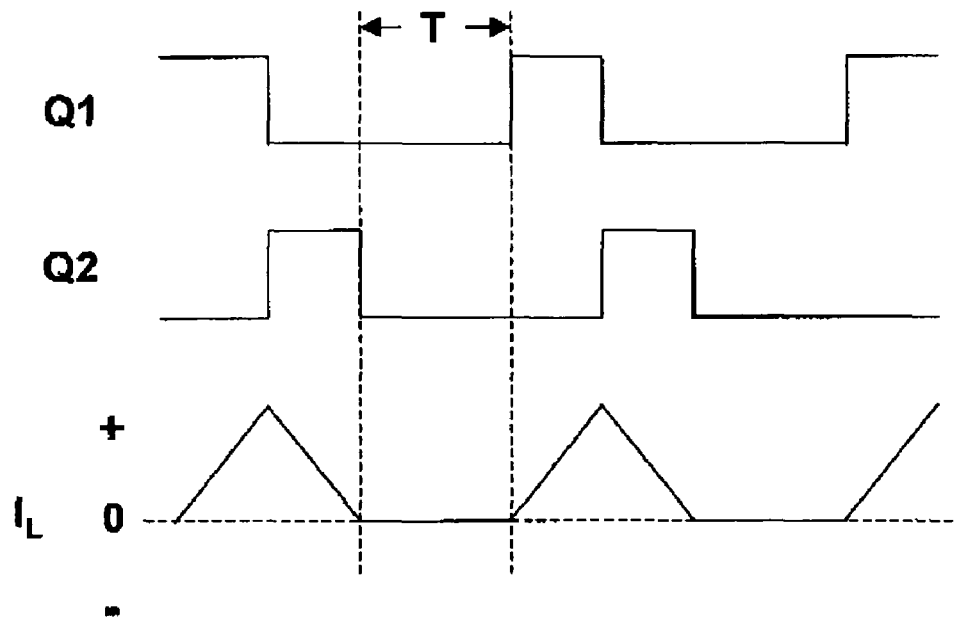
FIG. 5 schematically shows the ideal waveforms of the switching regulator proposed by U.S. Pat. No. 6,580,258.
Figure 8:
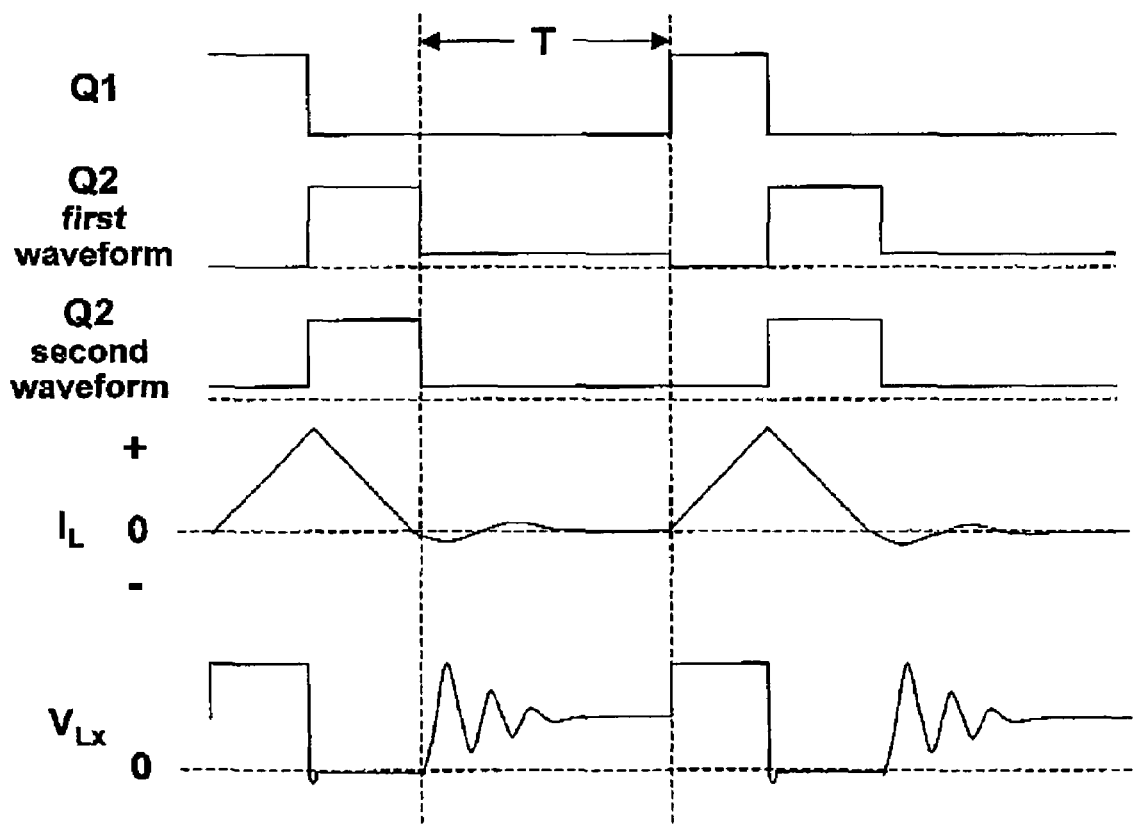
FIG. 8 schematically shows the actual waveforms of the switching regulator according to the present invention.

To further explain how the transistor Q2 is controlled, please refer to FIG. 8 in conjunction with FIG. 5. In prior art, the transistor Q2 assumes only one role, which is a switch, so it has only two states (completely ON and completely OFF). When the transistors Q1 and Q2 enter the sleep mode, they are both OFF. However, there is no such sleep mode in the present invention; as shown in FIG. 8, when the current $I_L$ on the inductor L is about to change from positive to negative, the transistor Q2 is not completely turned OFF, but its role is changed from a transistor switch to a current source that allows low current to flow through in the time period T. There are two ways to manage this: first, as shown by the first Q2 waveform, it can be arranged so that the transistor Q2 is OFF when the transistor Q1 is ON, and the transistor Q2 is changed to the low current state only in the time period T. Thus, the transistor Q2 includes three states: ON, OFF, and low current. Or, as shown by the second Q2 waveform, it can be arranged so that the transistor Q2 is always in the low current state unless it is ON. In this arrangement, the transistor Q2 includes only two states: ON, and low current. The first arrangement is advantageous in that it has better power conversion efficiency, while the second arrangement is advantageous in that it is less complicated in circuit hardware. Both arrangements belong to the scope of the present invention.

One skilled in this art would readily find that the transistors Q1 and Q2 shown in the figures are NMOS transistors. Certainly the transistors Q1 and Q2 can be replaced by PMOS transistors; although the corresponding waveforms are different, it still falls in the spirit of the present invention.

Figure 7:
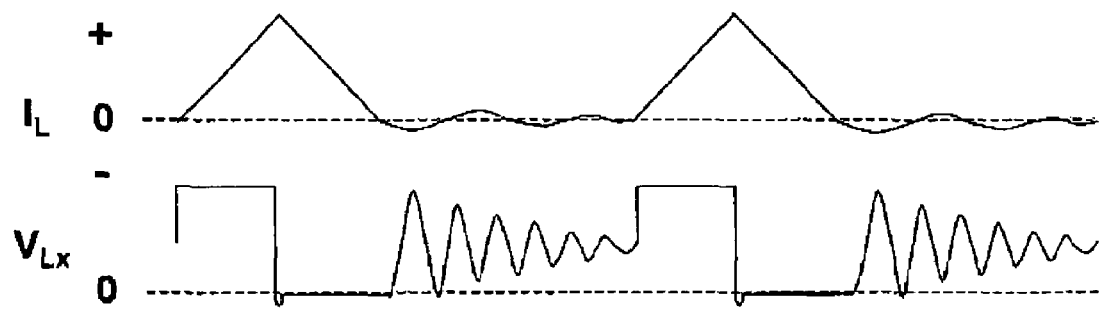
FIG. 7 schematically shows the actual waveforms of the switching regulator proposed by U.S. Pat. No. 6,580,258.

Please refer to FIG. 8 in conjunction with FIG. 7. Under the arrangement according to the present invention, in the time period T when the transistor Q1 is OFF and the transistor Q2 is in the low current state, although the voltage $V_{Lx}$ at the node Lx presents a damped simple harmonic motion waveform, the ringing quickly diminishes and the waveform quickly reaches a stable status. Therefore, the EMI noises resulting from high frequency damping is much lower than prior art.

Figure 6:
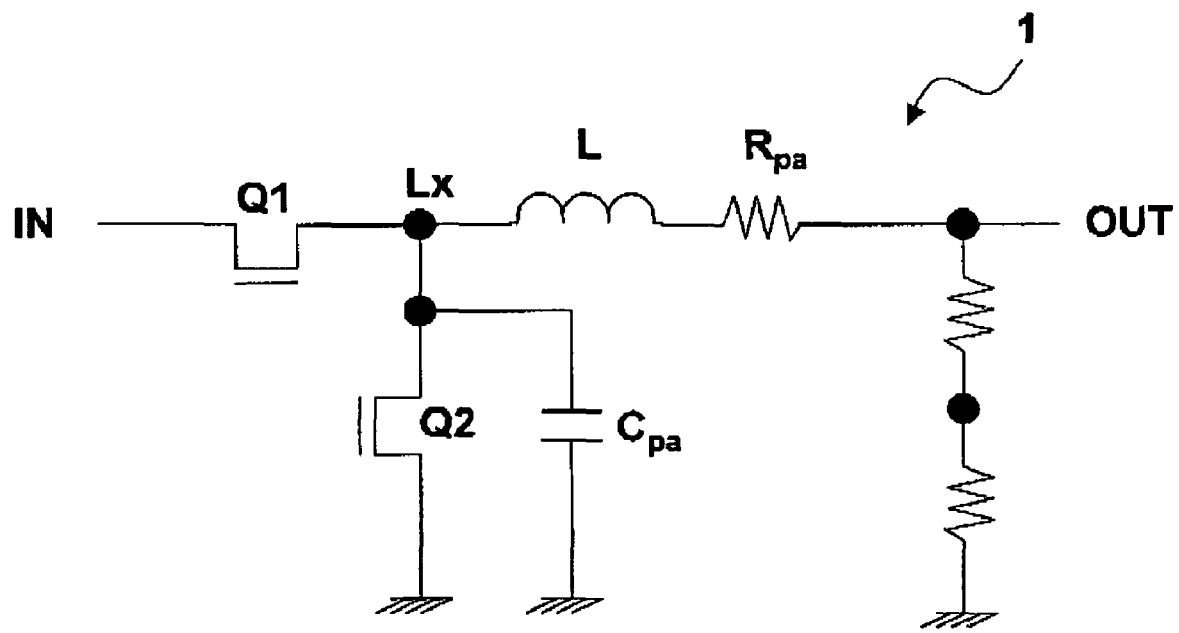
FIG. 6 is a circuit diagram schematically showing the parasitic capacitor and the parasitic resistor residing in a buck type switching regulator.

Referring back to FIG. 6, assuming the transistor Q2 and its parasitic capacitor $C_{pa}$ have a total parallel resistance of $R_{cs}$, when there is low current passing through the transistor Q2, the resistance $R_{cs}$ drops; the voltage $V_{Lx}$ at the node Lx in fact equals to:

$$VLx = \frac{V_{OUT}}{LC_{pa}} \times \frac{1}{S2 + S\left(\frac{L + C_{pa}R_{pa}R_{cs}}{LC_{pa}R_{cs}}\right) + \frac{R_{pa} + R_{cs}}{LC_{pa}R_{cs}}}$$

wherein $V_{Lx}$ is the voltage at the node Lx, Vout is the voltage at the output terminal OUT, S is a time-to-frequency conversion variable, L is the inductance of the inductor L, $C_{pa}$ is the capacitance of the capacitor $C_{pa}$, $R_{pa}$ is the resistance of the resistor $R_{pa}$, and $R_{cs}$ is the parallel resistance.

The voltage $V_{Lx}$ expressed by the above equation has a damping quality Q of:

$$Q = \frac{\sqrt{LC_{pa}R_{cs}(R_{pa} + R_{cs})}}{L + C_{pa}R_{pa}R_{cs}}$$

As seen from the equation, when $R_{cs}$ drops, Q corresponding decreases, meaning that the waveform reaches a stable status more quickly. Hence, if there is low current flowing through the transistor Q2 instead of completely turning OFF the transistor Q2, the high frequency damping period will become shorter, reducing EMI noises generated by the circuit.

The "low current" according to the present invention is any amount of current higher than or equal to 1 µA (micro-ampere) but below the current amount when the transistor is fully conductive. Also please note that, although the gate voltage of the transistor Q2 is shown in FIG. 8 to be a fixed value in the time period T, the present invention is not limited to this embodiment. The gate voltage of the transistor Q2 can vary in any desired manner, i.e., can be of any waveform in the time period T, provided that the current amount meets the foregoing requirement.

Figure 10:
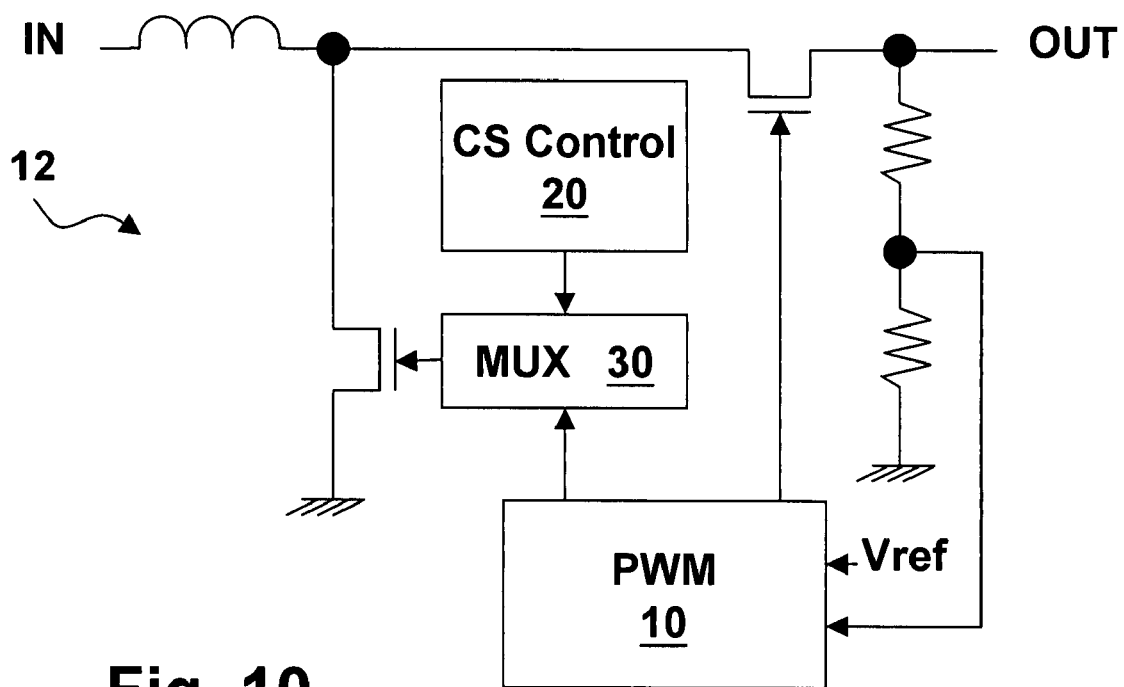
FIG. 10 is a circuit diagram schematically showing a boost type switching regulator according to an embodiment of the present invention.
Figure 11:
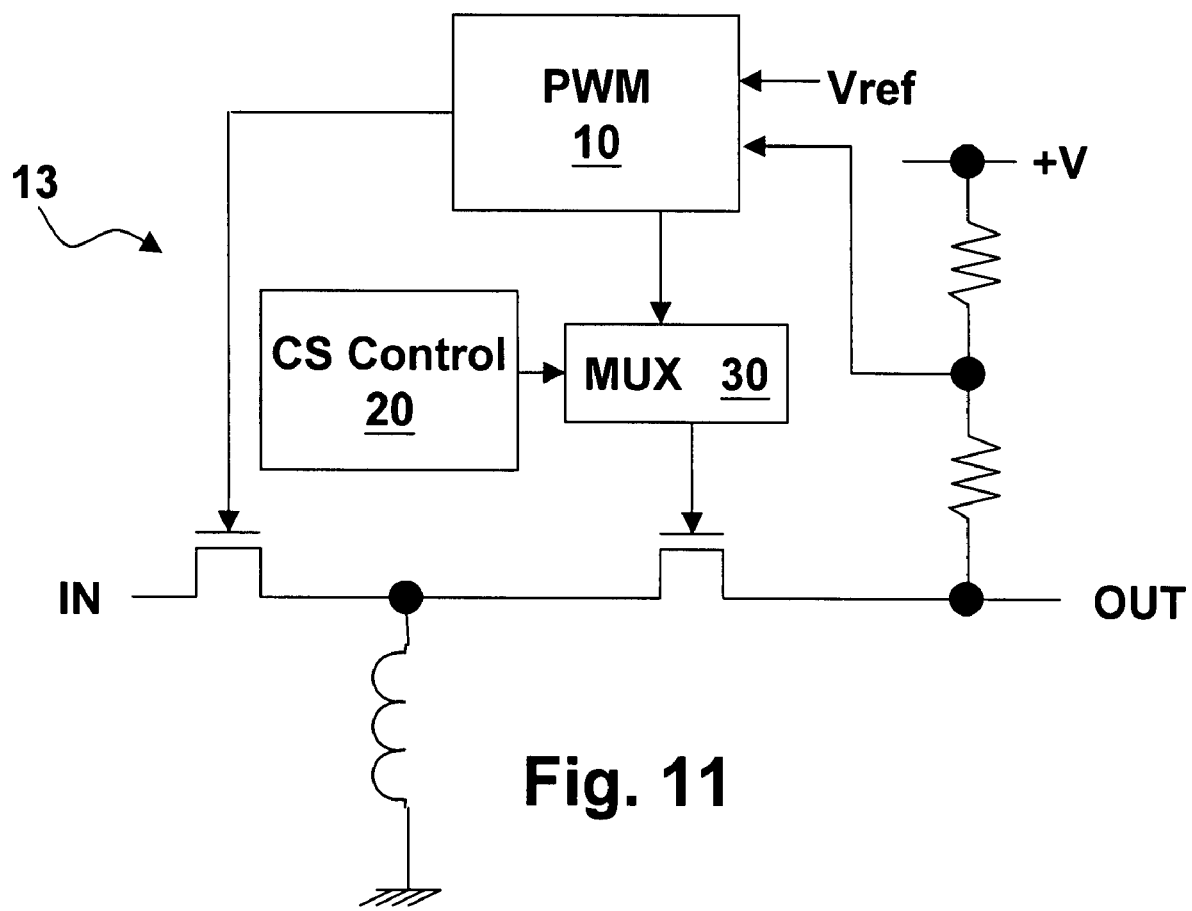
FIG. 11 is a circuit diagram schematically showing a inverter type switching regulator according to an embodiment of the present invention.

The spirit of the present invention can be similarly applied to boost type switching regulator 12 and inverter type switching regulator 13, as respectively shown in FIGS. 10 and 11. The detailed descriptions for such switching regulators are omitted here because they are well known by one skilled in this art.

Figure 12:
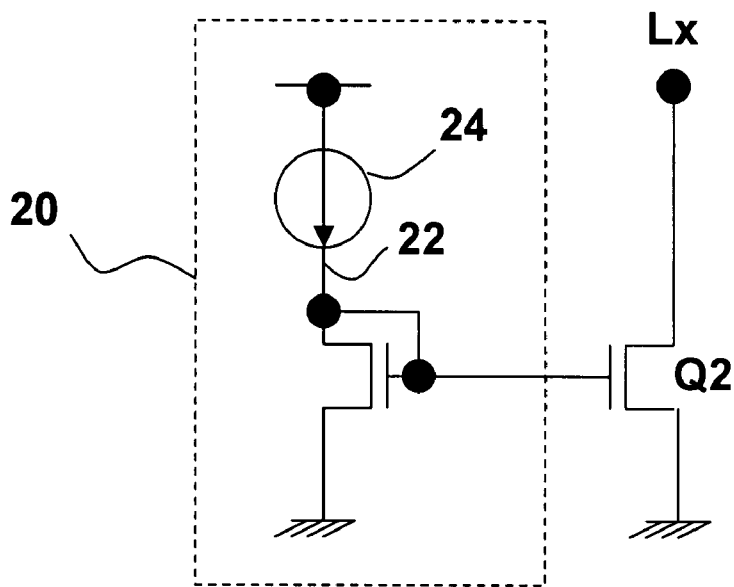
FIG. 12 is a circuit diagram schematically showing an embodiment of the current source control circuit 20.

As to how the current source control circuit 20 controls the current amount passing through the transistor Q2, please refer to FIG. 12 which is an embodiment of the current source control circuit 20. It shows that the current source control circuit 20 and the transistor Q2 construct a current mirror which mirrors the current on the path 22 inside the current source control circuit 20 proportionally to the source-to-drain path of the transistor Q2. The amount of current on the path 22 inside the current source control circuit 20 can be decided by a current source 24.

Figure 13:
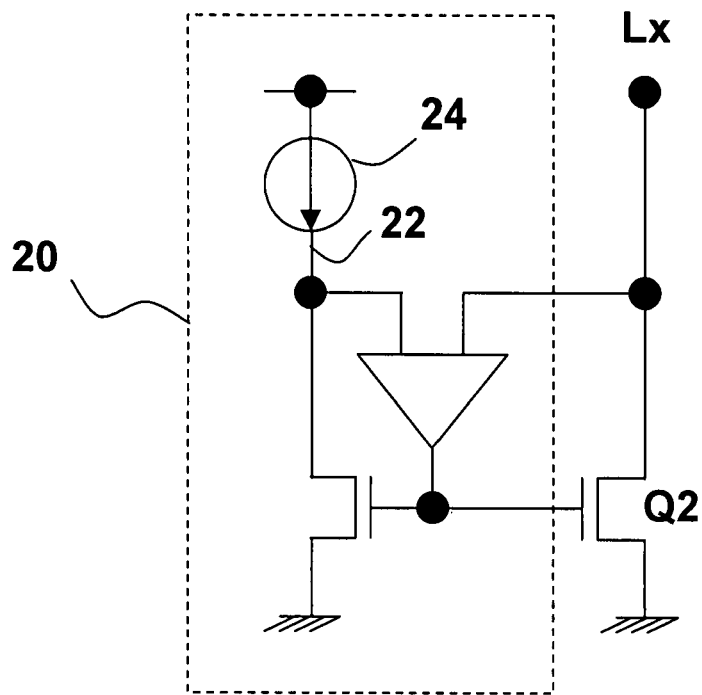
FIG. 13 is a circuit diagram schematically showing another embodiment of the current source control circuit 20.

The current source control circuit 20 can be embodied in various ways other than the above. FIG. 13 shows another embodiment of the current source control circuit 20 which also mirrors the current on the path 22 inside the current source control circuit 20 proportionally to the source-to-drain path of the transistor Q2. In light of the teaching by the present invention, one skilled in this art can readily think of many other variations, which should all belong to the scope of the present invention.

In FIGS. 12 and 13, the MUX 30 between the current source control circuit 20 and the transistor Q2 is not shown. In fact, the MUX 30 does not have to be a gate circuit, but instead can simply be a node, as long as the transistor Q2 can be dynamically controlled by the PWM 10 and the current source control circuit 20.

Figure 14:
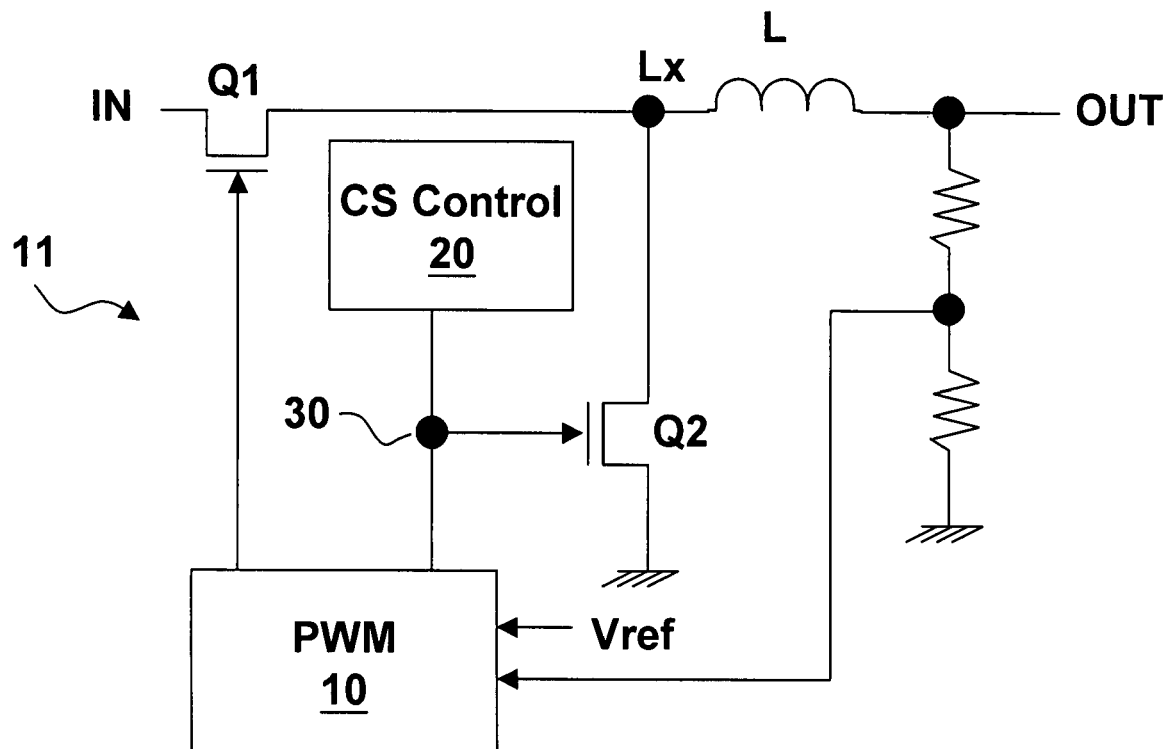
FIG. 14 is a circuit diagram schematically showing a buck type switching regulator according to another embodiment of the present invention, in which the multiplexer circuit 30 is a node.

Referring to FIG. 14 wherein the MUX 30 is a node, in this case the PWM 10 should be capable of pulling up the voltage at the node 30 (or capable of pulling down the voltage at the node 30 when the transistor Q2 is a PMOS transistor). When the transistor Q2 is an NMOS transistor, the waveform generated by this circuit corresponds to the second Q2 waveform in FIG. 8. More specifically, under normal condition, the transistor Q2 is controlled by the current source control circuit 20 so that there is small current passing through it (in other words, the transistor Q2 is normally in the low current state). In this normal condition, the PWM 10 does not control the node 30; the node 30 is floating, from the viewpoint of the PWM 10. When the PWM 10 decides to turn ON the transistor Q2, the output signal of the PWM overrides the control signal from the current source control circuit 20, to pull up (or pull down) the voltage at the node 30 so that that the transistor Q2 is completely conductive.

Figure 15:
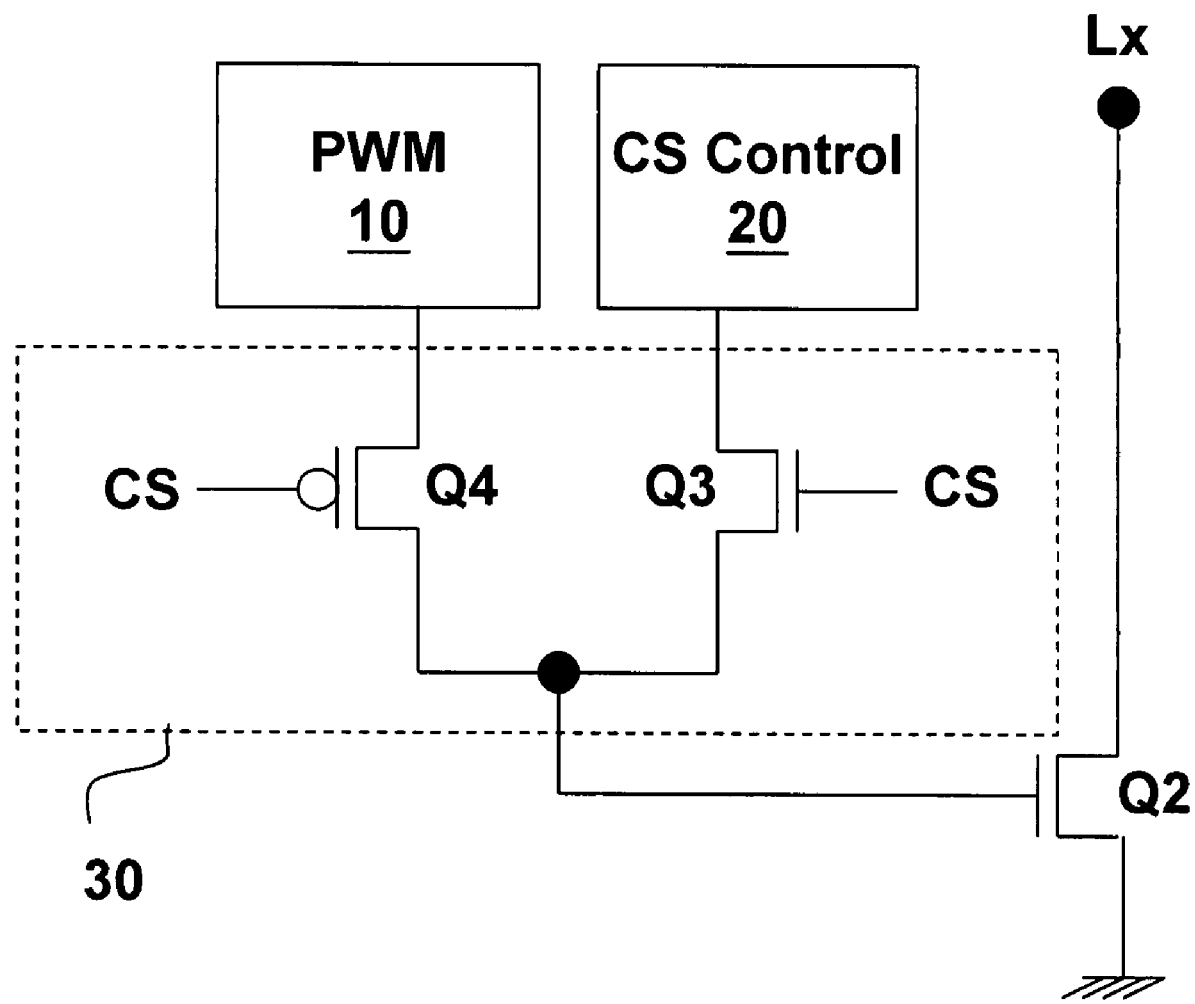
FIG. 15 is a circuit diagram schematically showing another embodiment of the multiplexer circuit 30.

Alternatively, the MUX 30 can be a more sophisticated circuit instead of a node, in order to achieve more sophisticated functions such as to achieve the first Q2 waveform shown in FIG. 8. One embodiment of such MUX 30 is shown in FIG. 15, which includes two transistors Q3 and Q4 controlled by a control signal CS. When the control signal CS is high, the gate of the transistor Q2 is controlled by the current source control circuit 20, whereas when the control signal CS is low, the gate of the transistor Q2 is controlled by the PWM 10. The PWM 10 can output high and low signals to completely turn ON and OFF the transistor Q2, so as to achieve the first Q2 waveform shown in FIG. 8.

Please note that there are other ways to embody the MUX 30; the two transistors Q3 and Q4 do not have to be NMOS and PMOS transistors as shown, and their control methods can vary. One skilled in this art can readily think of many variations, which should all belong to the scope of the present invention.

The features, characteristics and effects of the present invention have been described with reference to its preferred embodiments, which are provided only for illustrative purpose. Various other substitutions and modifications will occur to one skilled in the art, without departing from the spirit of the present invention. For example, in the described embodiments, the feedback signal to be inputted to the PWM 10 for comparison with the reference voltage Vref is obtained by dividing the output voltage Vout. However, the feedback signal can be obtained by many ways other than such. As another example, the amount of current on the path 22 inside the current source control circuit 20 can be controlled by many ways other than the current source 24. Therefore, all such substitutions and modifications are intended to be embraced within the scope of the invention as defined in the appended claims.

What is claimed is:

1. A switching regulator comprising:
   a first and a second transistors electrically connected with each other;

a pulse width modulation control circuit for turning ON and OFF the first transistor and turning ON the second transistor; and a current source control circuit for controlling the second transistor so that the second transistor becomes a current source, wherein the second transistor has only two states: ON or low current, in which when the first transistor is ON, the second transistor is in the low current state; and when the first transistor is OFF, the second transistor is ON or in the low current state, and wherein other than the time when the second transistor is ON, the second transistor is in the low current state, controlled by the current source control circuit.

2. The switching regulator of claim 1, wherein the pulse width modulation control circuit and the current source control circuit are both electrically connected to the gate of the second transistor.

3. The switching regulator of claim 2, wherein the pulse width modulation control circuit controls the gate voltage of the second transistor to turn it ON.

4. The switching regulator of claim 1, wherein an output of the pulse width modulation control circuit and an output of the current source control circuit are electrically connected with a multiplexer circuit, and the output of the multiplexer circuit controls the gate of the second transistor.

5. The switching regulator of claim 1, wherein the current source control circuit and the second transistor construct a current mirror.

6. The switching regulator of claim 1, wherein when the second transistor becomes a current source, the amount of current passing through the source-to-drain path of the second transistor is higher than or equal to 1 µA (micro-ampere) but below the current amount when the second transistor is fully conductive.

7. The switching regulator of claim 1, wherein the switching regulator is a buck type switching regulator, a boost type switching regulator, or an inverter type switching regulator.

8. A control circuit for a switching regulator having a first and a second transistors electrically connected with each other, the control circuit comprising:

a current source control circuit for controlling the second transistor to operate only in two states of ON or low current: to be ON or in the low current state when the first transistor is OFF, and to be in the low current state when the first transistor is ON: in the low current state the amount of current passing through the second transistor being higher than or equal to 1 µA (micro-ampere), wherein other than the time when the second transistor is ON, the second transistor is in the low current state.

9. The control circuit of claim 8, wherein the switching regulator includes an input terminal, an output terminal and a ground terminal, all of three terminals being electrically connected to a common node, and wherein the first transistor is located between the input terminal and the common node, and the second transistor is located between the common node and the ground terminal.

10. The control circuit of claim 8, wherein the switching regulator includes an input terminal, an output terminal and a ground terminal, all of three terminals being electrically connected to a common node, and wherein the first transistor is located between the common node and the output terminal, and the second transistor is located between the common node and the ground terminal.

11. The control circuit of claim 8, wherein the switching regulator includes an input terminal, an output terminal and a ground terminal, all of three terminals being electrically connected to a common node, and wherein the first transistor is located between the input terminal and the common node, and the second transistor is located between the common node and the output terminal.

12. The control circuit of claim 8, wherein the current source control circuit and the second transistor construct a current mirror.

13. The control circuit of claim 8, wherein the current source control circuit is electrically connected with the gate of the second transistor.

14. The control circuit of claim 8, wherein the current source control circuit is electrically connected with the gate of the second transistor via a multiplexer circuit.

15. A method for controlling a switching regulator, comprising the steps of:

providing a switching regulator having a first and a second transistors electrically connected with each other, the second transistor operating only in two states of ON or low current; and when the first transistor is OFF, controlling the second transistor to be ON or in the low current state, and when the first transistor is ON, controlling the second transistor to be in the low current state; in the low current state the amount of current passing through the second transistor being higher than or equal to 1 µA (micro-ampere), wherein other than the time when the second transistor is ON, the second transistor is in the low current state.

16. The method of claim 15, wherein the switching regulator includes an input terminal, an output terminal and a ground terminal, all of three terminals being electrically connected to a common node, and wherein the first transistor is located between the input terminal and the common node, and the second transistor is located between the common node and the ground terminal.

17. The method of claim 15, wherein the switching regulator includes an input terminal, an output terminal and a ground terminal, all of three terminals being electrically connected to a common node, and wherein the first transistor is located between the common node and the output terminal, and the second transistor is located between the common node and the ground terminal.

18. The method of claim 15, wherein the switching regulator includes an input terminal, an output terminal and a ground terminal, all of three terminals being electrically connected to a common node, and wherein the first transistor is located between the input terminal and the common node, and the second transistor is located between the common node and the output terminal.

19. The method of claim 15, further comprising the step of: providing a control signal which switches the second transistor to the low current state.

20. The method of claim 15, wherein the switching regulator includes a pulse width modulation control circuit, and the method further comprising the step of:

controlling the second transistor to be normally in the low current state; and turning ON the second transistor according to an output of the pulse width modulation control circuit.

* * * * *